United States Patent
Sengodan (10) Patent No.: US 11,713,134 B2
(45) Date of Patent: Aug. 1, 2023

(54) POWER SUPPLY FOR AIRCRAFT SYSTEMS

(71) Applicant: Hamilton Sundstrand Corporation, Charlotte, NC (US)

(72) Inventor: Rajkumar Sengodan, Tamilnadu (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 276 days.

(21) Appl. No.: 17/140,412

(22) Filed: Jan. 4, 2021

(65) Prior Publication Data

US 2021/0229828 A1 Jul. 29, 2021

(30) Foreign Application Priority Data

Jan. 7, 2020 (IN) .............................. 202011000604

(51) Int. Cl.
*B64D 41/00* (2006.01)
*G06F 1/30* (2006.01)
*H02J 9/06* (2006.01)

(52) U.S. Cl.
CPC ............... *B64D 41/00* (2013.01); *G06F 1/30* (2013.01); *H02J 9/061* (2013.01); *B64D 2221/00* (2013.01)

(58) Field of Classification Search
CPC ....... B64D 41/00; B64D 2221/00; G06F 1/30; H02J 9/061; H02M 3/156; H02M 1/0096
USPC .......................................................... 307/2
See application file for complete search history.

(56) References Cited

U.S. PATENT DOCUMENTS

| 4,807,102 | A | 2/1989 | Serras-Paulet |
|---|---|---|---|
| 7,061,212 | B2 | 6/2006 | Phadke |
| 7,859,874 | B2 | 12/2010 | Bovitz |
| 8,704,404 | B2 | 4/2014 | Lecourtier et al. |
| 8,710,820 | B2 | 4/2014 | Parker |
| 2005/0270812 | A1 | 12/2005 | Vinciarelli |
| 2007/0177407 | A1 | 8/2007 | Bruckmann et al. |
| 2009/0230771 | A1 | 9/2009 | De et al. |
| 2014/0015322 | A1 | 1/2014 | Milavec |
| 2017/0154739 | A1* | 6/2017 | Sugahara ............ H02M 1/4208 |

FOREIGN PATENT DOCUMENTS

| EP | 2827481 | A2 | 1/2015 |
|---|---|---|---|
| EP | 3179599 | A1 | 6/2017 |
| EP | 3427996 | * | 1/2019 |

OTHER PUBLICATIONS

Search Report issued in European Patent Application No. 20215998.4; Application Filing Date Dec. 21, 2020; dated May 31, 2021 (11 pages).

* cited by examiner

*Primary Examiner* — Richard Tan (74) *Attorney, Agent, or Firm* — Cantor Colburn LLP (57) ABSTRACT

Disclosed is a direct current power supply. The direct current power supply includes a voltage output defining a voltage rail and a ground. The direct current power supply includes a holdup capacitor operable to conduct with the voltage output. The direct current power supply includes a redundant power supply connected in series with the holdup capacitor between the voltage rail and the ground of the voltage output to provide the voltage output. The direct current power supply includes a first switch disposed between the holdup capacitor and the redundant power supply operable to create a conductive path between the holdup capacitor and the redundant power supply.

16 Claims, 6 Drawing Sheets

POWER SUPPLY FOR AIRCRAFT SYSTEMS

CROSS-REFERENCE TO RELATED APPLICATIONS

This application claims the benefit of Indian Application Serial No. 202011000604 filed Jan. 7, 2020, the disclosure of which is incorporated herein by reference in its entirety.

BACKGROUND

Aircraft often include power supplies for supply electrical buses with electricity. Electrical buses may be supplied with direct current for direct current loads. A holdup capacitor may be associated with the direct current buses to ensure operation continuity.

BRIEF DESCRIPTION

In addition to one or more of the features described above, or as an alternative, further embodiments may include that Disclosed is a direct current power supply. The direct current power supply includes a voltage output defining a voltage rail and a ground. The direct current power supply includes a holdup capacitor operable to conduct with the voltage output. The direct current power supply includes a redundant power supply connected in series with the holdup capacitor between the voltage rail and the ground of the voltage output to provide the voltage output. The direct current power supply includes a first switch disposed between the holdup capacitor and the redundant power supply operable to create a conductive path between the holdup capacitor and the redundant power supply.

In addition to one or more of the features described above, or as an alternative, further embodiments may include a diode connected in parallel with the holdup capacitor and having a forward direction oriented to permit current from the redundant power supply to the voltage output.

In addition to one or more of the features described above, or as an alternative, further embodiments may include a controller having logical instructions, and wherein the holdup capacitor is sized to maintain the voltage output greater than a voltage threshold during a time period, and the logical instructions close the first switch based on the voltage output falling below the voltage threshold.

In addition to one or more of the features described above, or as an alternative, further embodiments may include that the logical instructions comprise an SR flip-flop configured to close the first switch based on the voltage output falling below the voltage threshold.

In addition to one or more of the features described above, or as an alternative, further embodiments may include an alternating current source having a peak voltage, wherein the SR flip-flop is reset based on the peak voltage.

In addition to one or more of the features described above, or as an alternative, further embodiments may include that the logical instructions close the first switch based on the voltage output falling below the voltage threshold after a delay.

In addition to one or more of the features described above, or as an alternative, further embodiments may include a second switch having an actuation time, the second switch disposed between the holdup capacitor and the ground.

In addition to one or more of the features described above, or as an alternative, further embodiments may include that the delay is based on the actuation time.

In addition to one or more of the features described above, or as an alternative, further embodiments may include that the logical instructions open the second switch based on the voltage output falling below the voltage threshold.

In addition to one or more of the features described above, or as an alternative, further embodiments may include a voltage converter connected with the redundant power supply to supply the voltage output, wherein the logical instructions enable the voltage converter based on the voltage output falling below the voltage threshold.

In addition to one or more of the features described above, or as an alternative, further embodiments may include that the voltage converter comprises a converter switch configured to operate based on a difference between the voltage output and the voltage threshold.

Also disclosed is a method for maintaining a voltage output of a direct current power supply having a holdup capacitor connected to provide the voltage output and a redundant power supply. The method includes measuring the voltage output of the direct current power supply associated with the holdup capacitor. The method includes closing a first switch associated with a redundant power supply to provide the voltage output with the holdup capacitor and the redundant power supply based on the voltage output falling less than a voltage threshold. The method includes opening a second switch associated with the holdup capacitor and a ground of the voltage output.

In addition to one or more of the features described above, or as an alternative, further embodiments may include operating a voltage converter drawing power from the redundant power supply based on the voltage output.

In addition to one or more of the features described above, or as an alternative, further embodiments may include that the operating the voltage converter is such that the voltage output is maintained greater than the voltage threshold.

In addition to one or more of the features described above, or as an alternative, further embodiments may include that the operating the voltage converter is based on a voltage indication based on the voltage output and the closing the first switch is based on the voltage indication.

In addition to one or more of the features described above, or as an alternative, further embodiments may include that the second switch defines an actuation time associated with the opening of the second switch and the closing the first switch is delayed based on the actuation time.

In addition to one or more of the features described above, or as an alternative, further embodiments may include that opening the second switch and closing the first switch alters the reference voltage of the holdup capacitor.

Also disclosed is a direct current power supply. The direct current power supply includes a voltage output defining a ground. The direct current power supply includes a holdup capacitor sized to maintain the voltage output greater than a voltage threshold during a time period. The direct current power supply includes a redundant power supply connected in series with the holdup capacitor to provide the voltage output. The direct current power supply includes a first switch disposed between the holdup capacitor and the redundant power supply operable to conduct with the holdup capacitor and the redundant power supply. The direct current power supply includes a controller having logical instructions that close the first switch based on the voltage output falling below the voltage threshold.

In addition to one or more of the features described above, or as an alternative, further embodiments may include that the logical instructions comprise an SR flip-flop configured to close the first switch based on the voltage output falling below the voltage threshold.

In addition to one or more of the features described above, or as an alternative, further embodiments may include that the logical instructions close the first switch based on the voltage output falling below the voltage threshold after a delay.

BRIEF DESCRIPTION OF THE DRAWINGS

The following descriptions should not be considered limiting in any way. With reference to the accompanying drawings.

DETAILED DESCRIPTION

A detailed description of one or more embodiments of the disclosed apparatus and method are presented herein by way of exemplification and not limitation with reference to the Figures.

Figure 1:
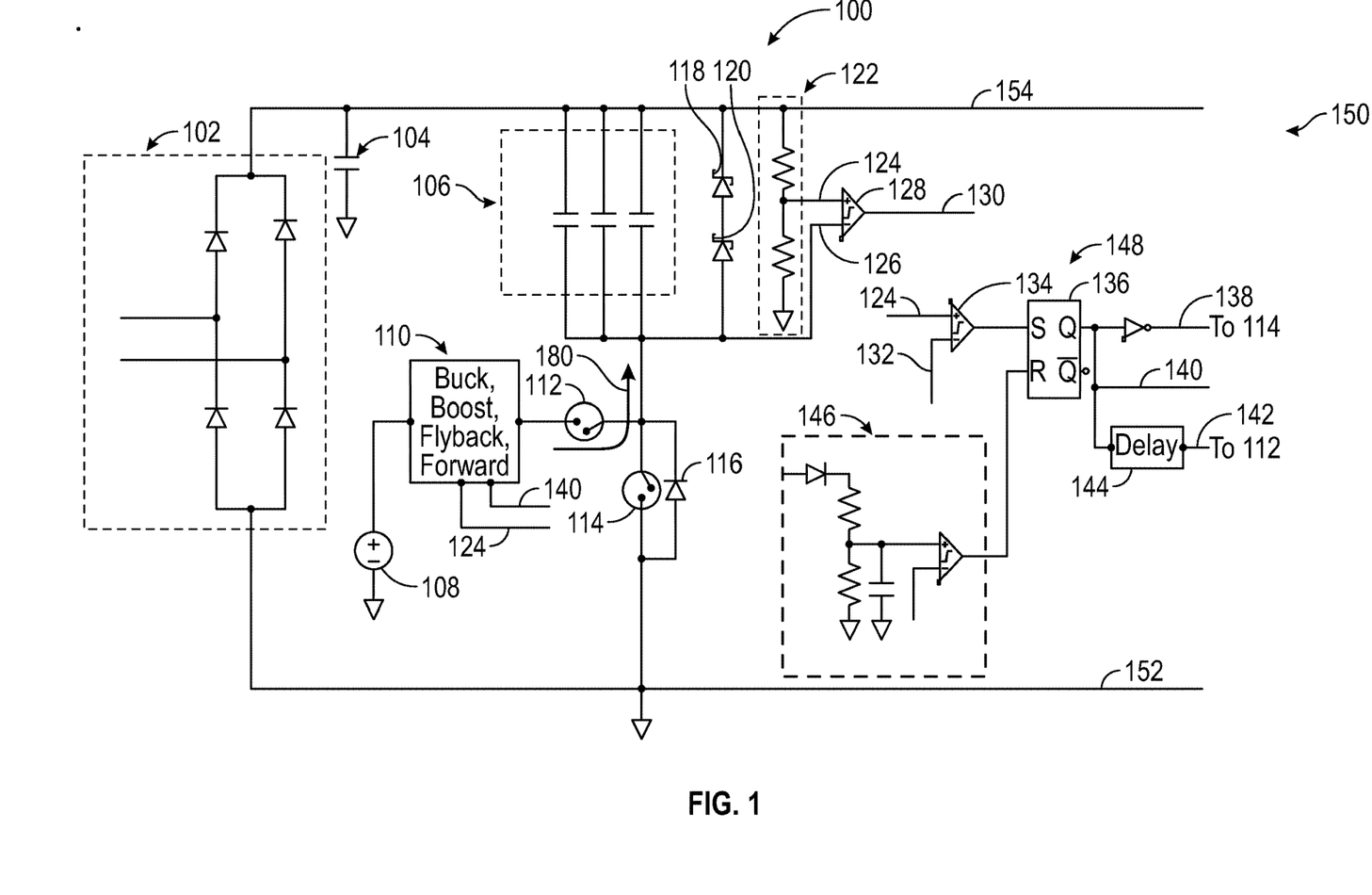
FIG. 1 illustrates a direct current power supply in accordance with one or more implementations of the present disclosure.

Referring to FIG. 1, a direct current power supply 100 is shown. The direct current power supply 100 may be disposed on an aircraft or any other vehicle. The term aircraft power supply 100 may be synonymous with a direct current power supply or any other type of power supply. The direct current power supply 100 includes a voltage output 150. The voltage output 150 defines a potential between rails that define a voltage rail 154 with respect to a ground 152. It should be appreciated that ground may refer to a negative voltage or ground interchangeably. The direct current power supply 100 may be supplied by a rectified alternating current source 102, as shown. It should be appreciated that the current supply to the direct current power supply 100 may be a rectified alternating current or a direct current. The alternating current source 102 may include electric generators or other implements. The alternating current source 102 may be an alternating current supply. The alternating current source 102 may be a three-phase current source. The alternating current source 102 may include a rectifier. The rectifier may be for a three-phase alternating current having a diode pairs for each phase. The rectifier may include diodes in a diode bridge or another configurations. The diode bridge output may be associated with the voltage output 150 or provide the voltage output 150. A link capacitor 104 may be used to smooth oscillations in current supplied from the diode bridge. The link capacitor 104 may be in parallel with the alternating current source 102—or rectified output thereof—and also in parallel with the voltage output 150.

A holdup capacitor 106 may be associated with the voltage output 150. The holdup capacitor 106 may be of any type. The holdup capacitor 106 may include any number of distinct capacitive devices. The holdup capacitor 106 may have a capacitance sized to maintain the voltage output 150 greater than a voltage threshold 410 (as shown in FIG. 5C) during a desired time period under a defined load. As an example, the holdup capacitor 106 may define a time constant associated with discharge of a portion or all of the energy stored in the holdup capacitor 106.

The holdup capacitor 106 may be connected in series with a redundant power supply 108 between the voltage rail 154 and the ground 152. The redundant power supply 108 may be a battery, capacitor, or another implement. The redundant power supply 108 may be charged through an auxiliary power bus or another implement (not shown). The redundant power supply 108 may be connected in series such that the voltage output 150 may be a sum of the holdup capacitor 106 and the redundant power supply 108. A first switch 112 may be disposed between the holdup capacitor 106 and the redundant power supply 108 to selectively engage the redundant power supply 108 and create a conductive path between the holdup capacitor 106 and the redundant power supply 108. It should be appreciated that the first switch 112 may be any type of switch. The first switch 112 may be a semiconducting switch. The first switch 112 may be an insulated-gate bipolar transistor (IGBT) or a metal-oxide-semiconductor field-effect transistor (MOSFET).

The redundant power supply 108 may be associated with a voltage converter 110. The voltage converter 110 may be any type of voltage converter 110, including—but not limited to—buck, boost, buck-boost, flyback, and forward converters. The voltage converter 110 may be disposed between the first switch 112 and the redundant power supply 108. The voltage converter 110 may be used to adjust the voltage level of the reference ground provided to the holdup capacitor 106 or the voltage output 150.

A second switch 114 may be disposed between the holdup capacitor 106 and the ground 152. The second switch 114 may be any type of switch. The second switch 114 may be a semiconducting switch. The second switch 114 may be an IGBT or a MOSFET. The second switch 114 may include an anti-parallel diode 116 or any other type of diode. The anti-parallel diode 116 may be integrated with the second switch 114. The second switch 114 allows for the holdup capacitor 106 to be connected the ground 152 and, thus, bypass the redundant power supply 108.

One or more diodes (e.g., diodes 118, 120) may be disposed to enable a conduction path between the redundant power supply 108 and the voltage rail 154. The diodes 118, 120 may be connected in parallel with the holdup capacitor 106. The diodes 118, 120 or any other diodes discussed herein may be any type of diode. As an example, the diodes 118, 120 may be Schottky diodes. When the diodes 118, 120 are biased in a forward direction they allow current to flow from the redundant power supply 108 to the voltage output 150.

An attenuation circuitry 122 may be used to provide a voltage indication 124. The attenuation circuitry 122 may include a voltage divider circuit to provide the voltage indication 124. The voltage indication 124 may be compared with a holdup capacitor reference 126. As such, the voltage indication 124 with respect to holdup capacitor reference 126, as determined by holdup capacitor comparator 128, provides an indication of the holdup capacitor voltage output 130. The holdup capacitor voltage output 130 may be used by other controllers or circuitry to provide an indication of holdup capacitor voltage output 130.

The voltage indication 124 may be used to determine whether the holdup capacitor voltage output is less than a voltage threshold 410 (as shown in FIG. 5C) defined by voltage reference 132. As the voltage indication 124 falls to less than the voltage reference 132, indicating holdup capacitor 106 depletion, the voltage indication comparator 134 outputs a logic state (e.g., HIGH) to SET the set-reset (SR) flip-flop 136.

The SR flip-flop 136 provides control signals to the switches 112, 114 and the voltage converter 110. Under normal operation the second switch 114 is closed allowing the alternating current source 102 to provide voltage to the voltage output 150 while charging the holdup capacitor 106. Fluctuations in power from alternating current source 102 may cause the holdup capacitor 106 to provide the necessary power to the voltage output 150. As the holdup capacitor 106 depletes, and the voltage indication 124 decreases, voltage indication comparator 134 sets the SR flip-flop 136. The output of the SR flip-flop 136 goes HIGH, which drives second switch control signal 138 LOW and opens the second switch 114. The HIGH output of the SR flip-flop 136 drives the first switch control signal 142 HIGH and closes the first switch 112. As such, as the holdup capacitor 106 depletes, the redundant power supply 108 is connected with the holdup capacitor 106 and the voltage output 150 to maintain the proper voltage. The SR flip-flop 136 may provide an enable logic signal 140. The enable logic signal 140 may enable operation of the voltage converter 110. The voltage converter 110 may further receive the voltage indication 124 to properly adjust the voltage.

The logical signals, comparators, flip-flops and other logic disclosed herein may be referred to as logical instructions 148. Logical instructions 148 may include any instructions based on logic that operate or control components of the direct current power supply 100. The logical instructions 148 may be implemented collectively as a controller that includes any combination of processors, field programmable gate arrays (FPGA), or application specific integrated circuits (ASIC). The controller may include memory, volatile and non-volatile, operable to store the logical instructions 148 associated with the processors and other processing mechanisms to receive, calculate, and control devices, as necessary. Logical instructions 148 may be further stored (e.g., stored instructions, stored machine instructions, stored steps) in any language or representation, including but not limited to machine code, assembly instructions, C, C++, C#, PASCAL, COBAL, PYTHON, JAVA, and RUBY. Communications may be realized through any protocol or medium.

The SR flip-flop 136 may also receive a generator status indication 146 to indicate whether the alternating current source 102 has come back online. The generator status indication may receive a single-phase or multiphase input from the alternating current source 102. As such, the generator status indication 146 is attached to the reset input of the SR flip-flop 136. The generator status indication 146 may include a rectifying diode and a voltage-divider circuit as inputs to a generator comparator. The generator comparator may compare the rectified and smoothed generator output and a generator reference voltage. The generator reference voltage may be configured to provide a voltage adjusted to indicate proper operation of the alternating current source 102. As such, a reset of the SR flip-flop 136 would open the first switch 112 and close the second switch 114 and return to normal operation.

Figure 2:
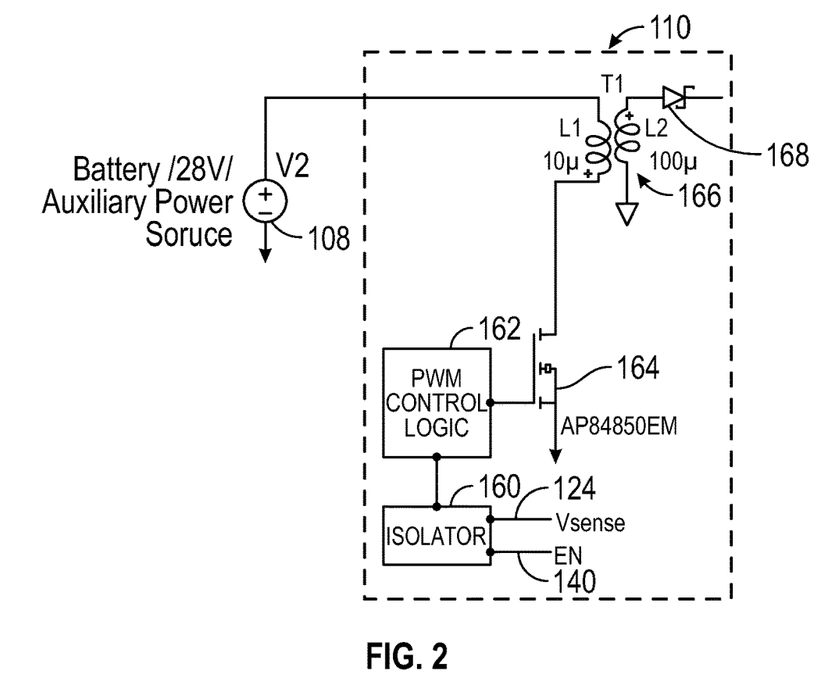
FIG. 2 illustrates a voltage converter associated with a direct current power supply in accordance with one or more implementations of the present disclosure.

Referring to FIG. 2, one example of a voltage converter 110 is shown. The voltage converter 110 may be any other implement, as discussed above. The voltage converter 110 may be a flyback type, as shown. The voltage indication 124 and enable logic signal 140 may be isolated, optically or otherwise, through isolator 160 with the pulse-width modulation (PWM) control logic 162. The PWM control logic 162 is configured to drive the converter switch 164. The converter switch 164 is configured to generate an alternating or variable current through the transformer 166 from the redundant power supply 108. The converter switch 164 may be configured to operate based on the difference between the voltage output 150 and the voltage threshold 410. As an example, the PWM control logic 162 may be configured to output a frequency or duty cycle that is based on the voltage indication 124 or a difference between the voltage indication 124 and the voltage reference 132. This current is transferred across the transformer 166 and rectified with diode 168.

Figure 3:
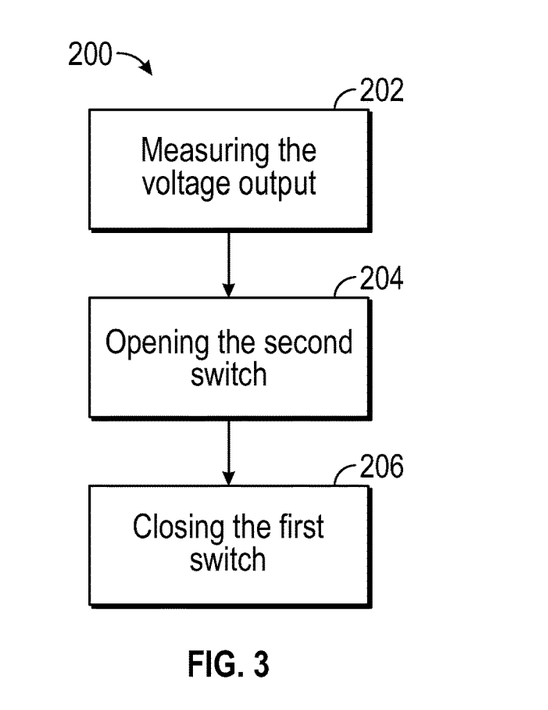
FIG. 3 illustrates method, or portions thereof, associated with operating a direct current power supply in accordance with one or more implementations of the present disclosure.

Referring to FIG. 3, a step-by-step method 200 is shown. It should be appreciated that any of the steps may be rearranged or organized. Steps may be added, omitted, and/or duplicated. In step 202, the voltage output 150 of the direct current power supply 100 is measured by the attenuation circuitry 122 or other circuitry. The measurement may include proportional or other adjustments to define the voltage indication 124.

In step 204, the second switch 114 is opened. It should be appreciated that the steps may occur in any order—sequentially or simultaneously. The second switch 114 may disconnect the holdup capacitor 106 from the ground 152. The method 200 may further include operating a voltage converter 110. The voltage converter 110 may be configured to draw power from the redundant power supply 108. The voltage converter 110 may be operable to maintain the proper voltage level (i.e., greater than the voltage threshold 410) on the voltage output 150 using feedback. The feedback may be provided by the voltage indication 124. The voltage indication 124 is shown as proportional to the voltage output 150 but may be defined other ways. The second switch 114 may define an actuation time (e.g., 1 ms). The first switch 112 may be closed after a delay 144 (e.g., 2 ms) to prevent cross-conduction. The delay 144 may be generated according to an RC time constant. As an example, a resistor-capacitor configuration may delay the actuation of the first switch 112.

In step 206, the first switch 112 is closed to increase the voltage at the voltage output 150. As the stored energy in the holdup capacitor 106 is dissipated, the redundant power supply 108 may be used to supplement the voltage output 150 by closing the first switch 112. The first switch 112 may be closed based on the voltage indication 124.

Figure 4:
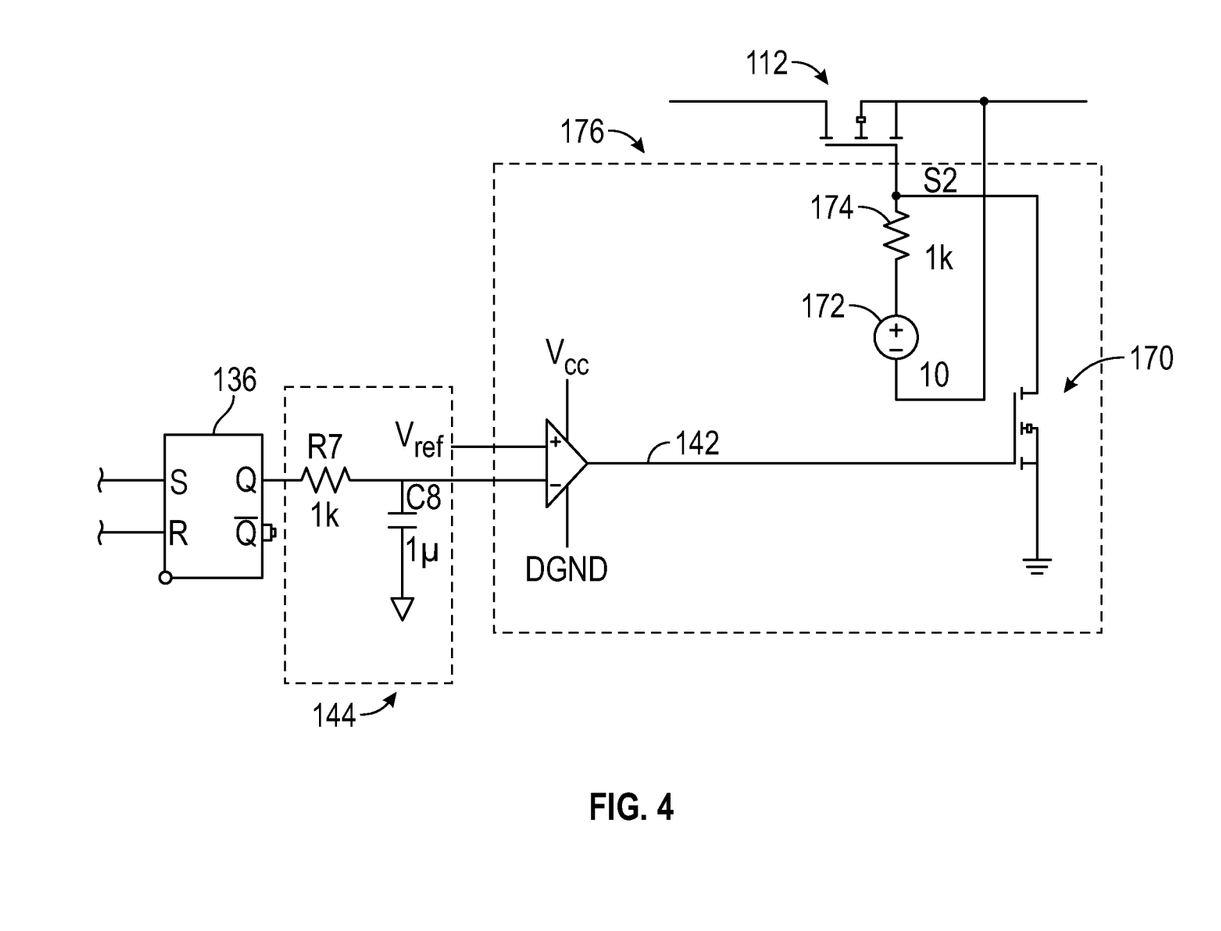
FIG. 4 illustrates a driver for a switch associated with the direct current power supply in accordance with one or more implementations of the present disclosure.

Referring to FIG. 4, driver circuitry 176 for the first switch 112 is shown. The SR flip-flop 136 is shown having SET and RESET inputs and Q and $\overline{Q}$ as outputs. A delay 144 may be implemented as an resistor-capacitor (RC) circuit or use another implement to provide a dead time between first switch 112 and second switch 114 switching operation. An operational amplifier may be used to drive the output from the SR flip-flop 136 as shown to generate the first switch control signal 142. Driver switch 170 may be used to amplify the first switch control signal 142 along with driver power supply 172. The driver power supply 172 may be coupled in series with a driver resistor 174 to drive the gate of the first switch 112. As such, the voltage indication 124 is used to SET the SR flip-flop 136, and the SR flip-flop 136 outputs a signal that is delayed and used to drive the first switch 112.

Figure 5A:
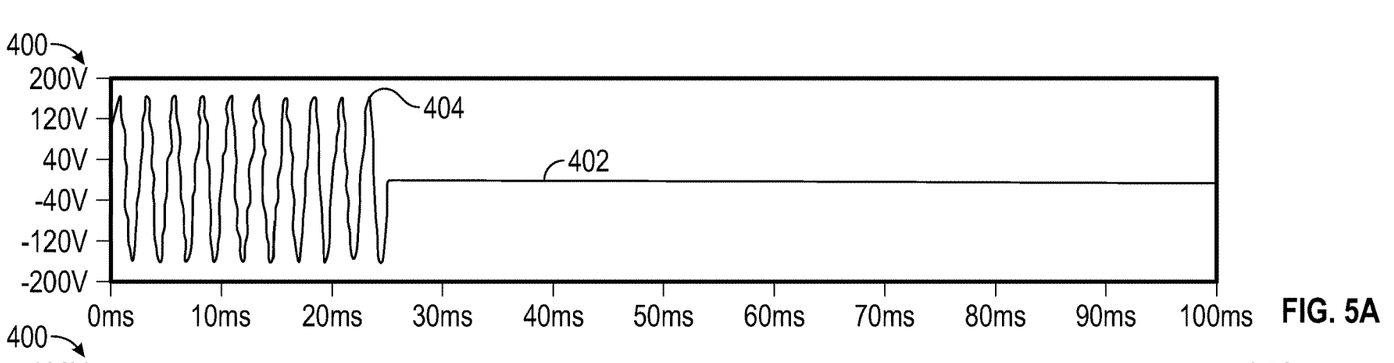
FIG. 5A illustrates a voltage of an alternating current source.
Figures 5B, 5C:
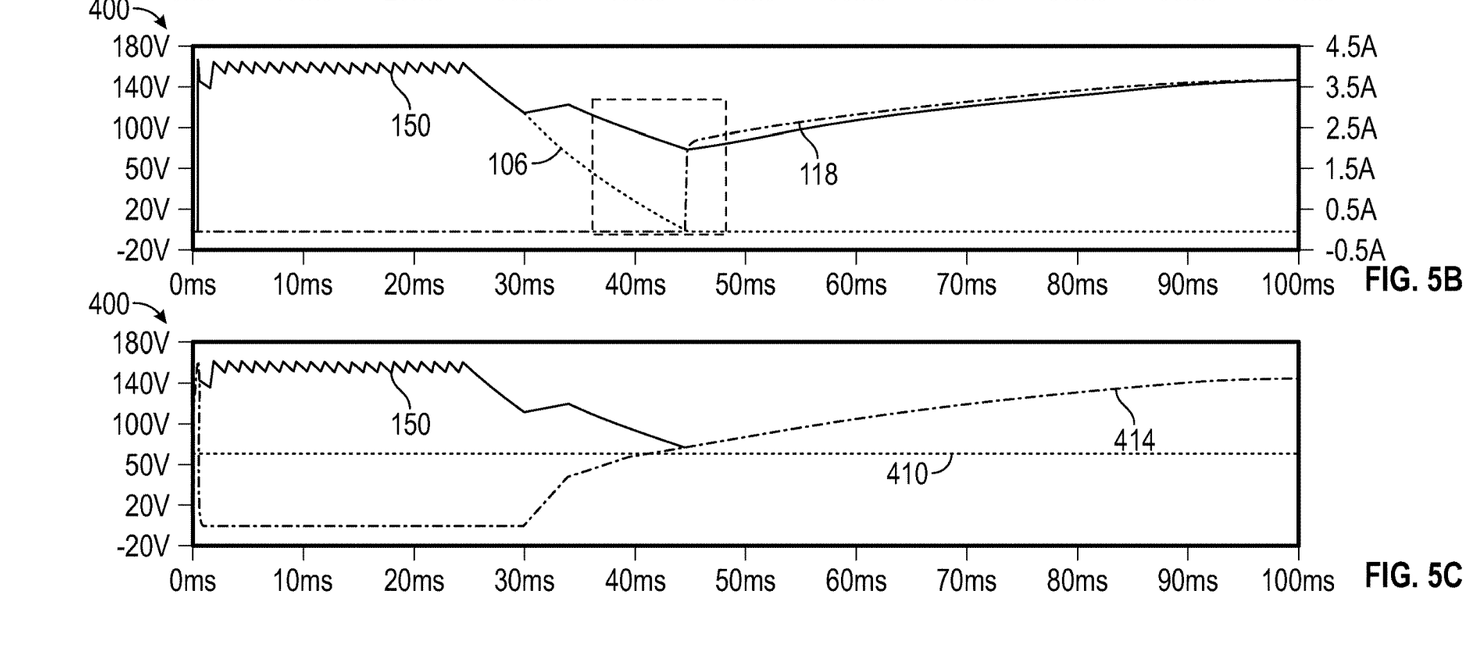
FIG. 5B illustrates a voltage output of a direct current power supply with respect to a holdup capacitor and a diode current.
FIG. 5C illustrates a voltage output with respect to a redundant power supply voltage.
Figure 5D:
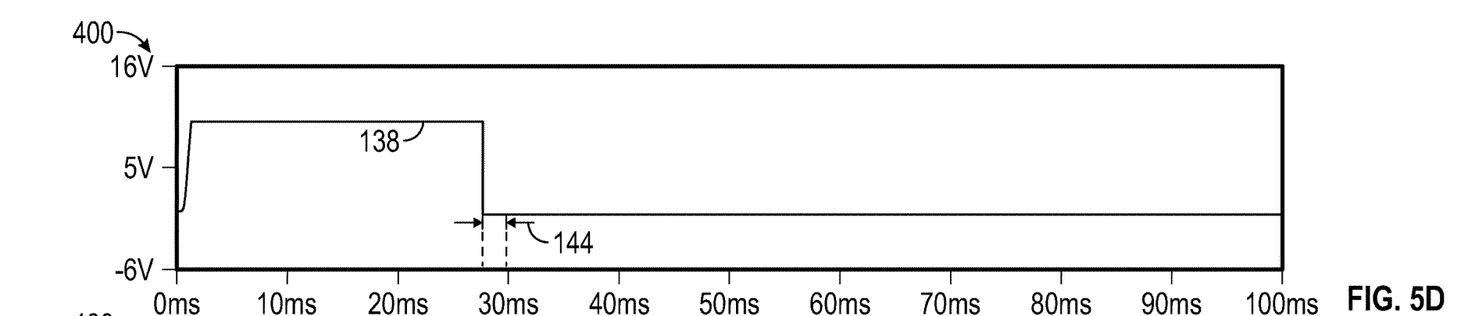
FIG. 5D illustrates a second switch control signal associated with a direct current power supply.
Figure 5E:
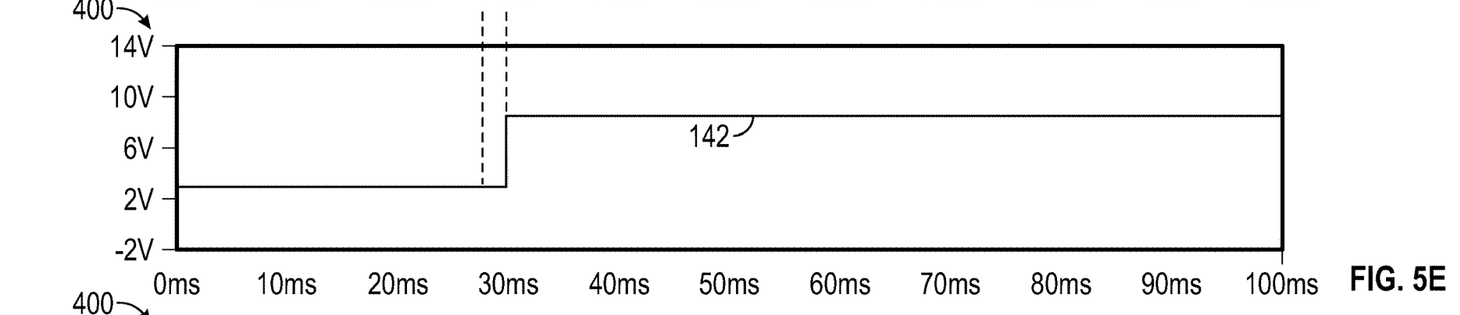
FIG. 5E illustrates a first switch control signal associated with a direct current power supply.
Figure 5F:
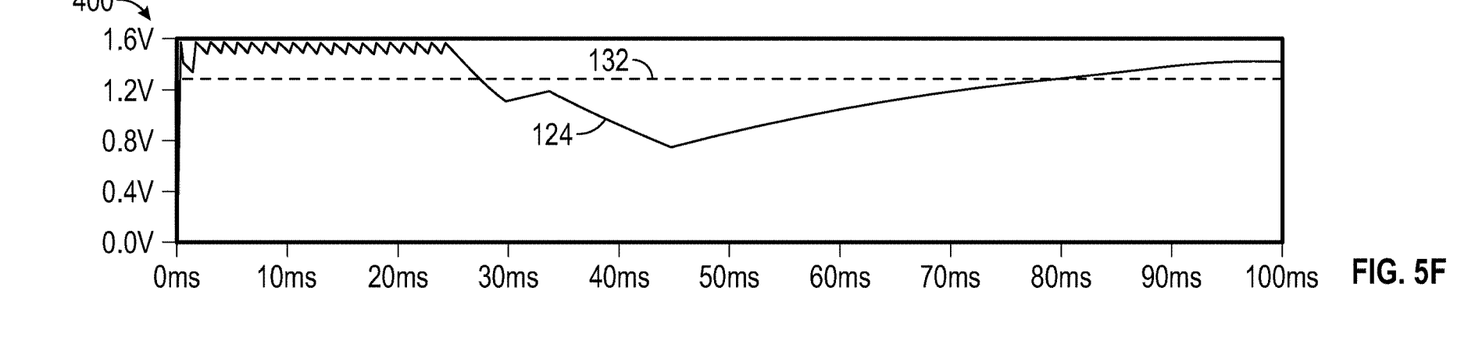
FIG. 5F illustrates a voltage indication associated with a direct current power supply.
Figure 5G:
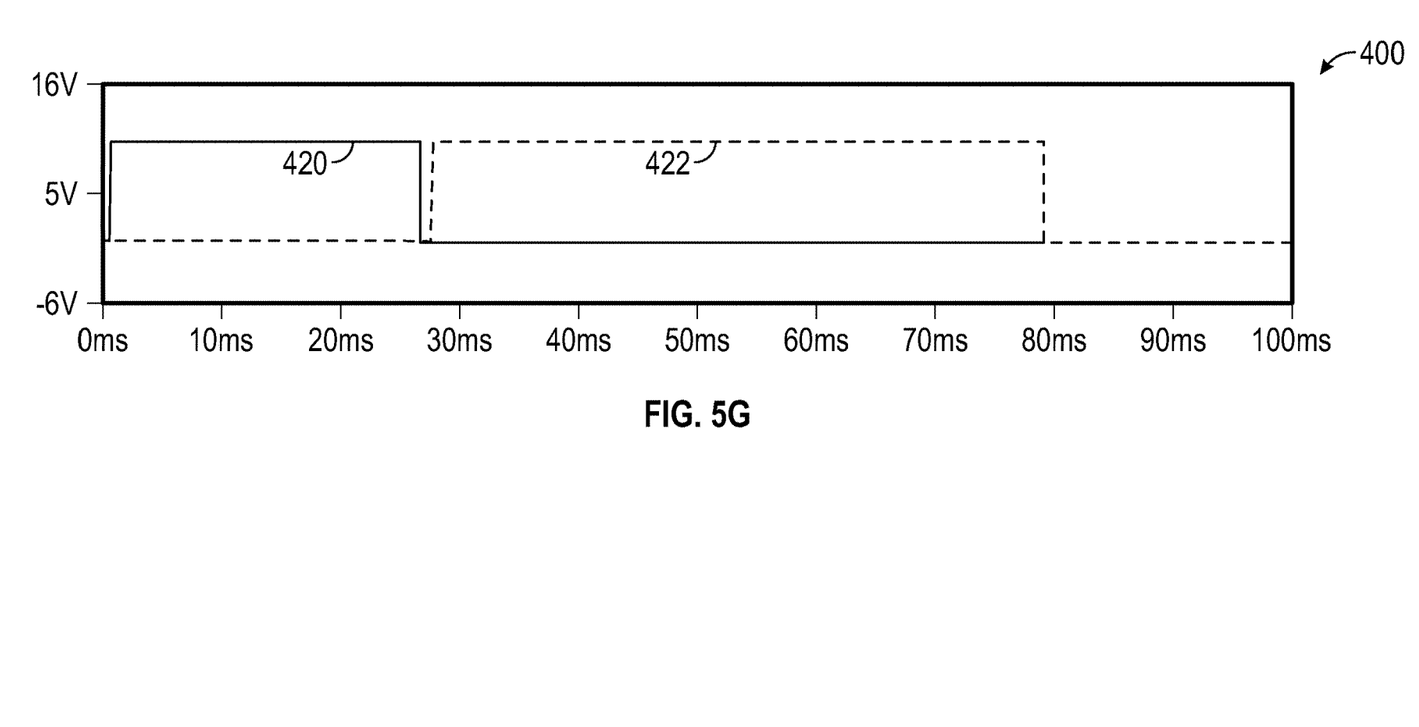
FIG. 5G illustrates state indications of an flip-flop associated with a direct current power supply.

Referring to FIGS. 5A-G, example electrical parameters 400 of the direct current power supply 100 are shown. FIG. 5A provides an output voltage of the alternating current source 102. The output of 102 is alternating current as shown. The alternating current source 102 provides a voltage 402 having a peak voltage 404. An interruption of the alternating current source 102 may be realized as shown around 28 ms, as the undulating pattern of the voltage 402 flatlines. FIG. 5G illustrates the SR flip-flop input states. The alternating current source 102 under normal operation is associated with the RESET 420 of the SR flip-flop 136. As the voltage 402 flatlines, the RESET 420 of the SR flip-flop 136 goes LOW. Should the alternating current source 102 return to normal operation, the RESET 420 will be set to HIGH to reset the SR flip-flop 136.

Referring to FIGS. 5B-C, the power output 150 is illustrated with respect to a voltage of the holdup capacitor 106 and current through the one or more diodes 118, 120. Under normal conditions, and under power from the alternating current source 102, the voltage output 150 is shown as having a generally constant voltage output (e.g., 160 V). As the alternating current source 102 flatlines (e.g. the power source 102 is disconnected or intermittently operates), the voltage output 150 begins to drop slowly (rather than instantly), as the holdup capacitor 106 maintains the voltage level at the voltage output 150. As the charge stored in the holdup capacitor 106 decays the holdup capacitor 106 is unable to maintain the voltage at the output 150 above voltage threshold 410, the redundant power supply 108 is used to supplement the holdup capacitor 106. As shown the threshold is 60V but that is not meant as limiting, and all voltages, currents, and other values are as examples only.

Referring to FIG. 5F, the voltage indication 124 corresponds with the voltage output 150 and is illustrated with the voltage reference 132. The reference can be proportional to, for example, the threshold 410 of FIG. 5C. As the voltage indication 124 falls below the voltage reference 132, switch 112 is closed by the logical instructions 148 and the SET 422 logical value of the set input pin of the SR flip-flop 136. This allows for the redundant power supply 108 to provide part of the voltage output 150. While the holdup capacitor 106 is providing power to the voltage output 150, the redundant power supply 108 may be used to change the base potential or reference potential of the holdup capacitor 106 such that the voltage of the redundant power supply 108 and the voltage on the holdup capacitor 106 are summed to provide the voltage output (series configuration). As the voltage of the holdup capacitor 106 falls, the current through the diodes 118, 120 increases to arrange the redundant power supply 108 in parallel with the voltage output 150.

In some embodiments the voltage provided by the redundant power supply 108 may be increased or adjusted in any direction by the voltage converter 110, or any combination thereof, to provide redundant voltage 414 such that the voltage output 150 is maintained above the voltage threshold 410. The voltage provided by the voltage converter 110 may correspond to a difference between the voltage indication 124 and the voltage reference 132.

As the voltage indication 124 falls below the voltage reference 132, the second switch control signal 138 is driven LOW. After the delay 144, the first switch control signal 142 is driven HIGH to introduce the voltage provided by the redundant power supply 108, the voltage converter 110, or any combination thereof.

It should be appreciated that any of the switches, diodes, logical instructions, flip-flops, power sources and otherwise disclosed herein are depicted as one of many possible examples. As just one of many examples, various diode architectures exist that may be implemented as discussed in this disclosure having relative benefits and detriments. This disclosure is not limited to any particular device architecture.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A direct current power supply comprising:
    a voltage output defining a voltage rail and a ground;
    a holdup capacitor operable to conduct with the voltage output;
    a diode connected in parallel with the holdup capacitor and having a forward direction oriented to permit current from the redundant power supply to the voltage output;
    a redundant power supply connected in series with the holdup capacitor between the voltage rail and the ground of the voltage output to provide the voltage output; and
    a first switch disposed between the holdup capacitor and the redundant power supply operable to create a conductive path between the holdup capacitor and the redundant power supply.

2. The direct current power supply of claim 1, further comprising a controller having logical instructions, and wherein the holdup capacitor is sized to maintain the voltage output greater than a voltage threshold during a time period, and the logical instructions close the first switch based on the voltage output falling below the voltage threshold.

3. The direct current power supply of claim 2, wherein the logical instructions comprise an SR flip-flop configured to close the first switch based on the voltage output falling below the voltage threshold.

4. The direct current power supply of claim 3, further comprising an alternating current source having a peak voltage, wherein the SR flip-flop is reset based on the peak voltage.

5. The direct current power supply of claim 2, wherein the logical instructions close the first switch based on the voltage output falling below the voltage threshold after a delay.

6. The direct current power supply of claim 5, further comprising a second switch having an actuation time, the second switch disposed between the holdup capacitor and the ground.

7. The direct current power supply of claim 6, wherein the delay is based on the actuation time.

8. The direct current power supply of claim 6, wherein the logical instructions open the second switch based on the voltage output falling below the voltage threshold.

9. The direct current power supply of claim 2, further comprising a voltage converter connected with the redundant power supply to supply the voltage output, wherein the logical instructions enable the voltage converter based on the voltage output falling below the voltage threshold.

10. The direct current power supply of claim 9, wherein the voltage converter comprises a converter switch configured to operate based on a difference between the voltage output and the voltage threshold.

11. A method for maintaining a voltage output of a direct current power supply having a holdup capacitor connected to provide the voltage output and a redundant power supply, the method comprising:
    measuring the voltage output of the direct current power supply associated with the holdup capacitor;
    closing a first switch associated with the redundant power supply to provide the voltage output with the holdup capacitor and the redundant power supply based on the voltage output falling less than a voltage threshold;
    opening a second switch associated with the holdup capacitor and a ground of the voltage output, the second switch defining an actuation time associated with the opening the second switch and the closing the first switch is delayed based on the actuation time; and
    operating a voltage converter drawing power from the redundant power supply based on the voltage output such that the voltage output is maintained greater than the voltage threshold.

12. The method of claim 11, wherein the operating the voltage converter is based on a voltage indication based on the voltage output and the closing the first switch is based on the voltage indication.

13. The method of claim 11, wherein the opening the second switch and the closing the first switch alters a reference voltage of the holdup capacitor.

14. A direct current power supply comprising:
    a voltage output defining a ground;
    a holdup capacitor sized to maintain the voltage output greater than a voltage threshold during a time period;
    a redundant power supply connected in series with the holdup capacitor to provide the voltage output; and
    a first switch disposed between the holdup capacitor and the redundant power supply operable to create a conductive path between the holdup capacitor and the redundant power supply in response to closing the first switch; and
    a controller having logical instructions that close the first switch based on the voltage output falling below the voltage threshold,
    wherein the logical instructions comprise an SR flip-flop configured to close the first switch based on the voltage output falling below the voltage threshold.

15. The direct current power supply of claim 14, wherein the logical instructions close the first switch based on the voltage output falling below the voltage threshold after a delay.

16. A direct current power supply:
    a voltage output defining a voltage rail and a ground;
    a holdup capacitor operable to conduct with the voltage output, the holdup capacitor sized to maintain the voltage output greater than a voltage threshold during a time period;
    a redundant power supply connected in series with the holdup capacitor between the voltage rail and the ground of the voltage output to provide the voltage output;
    a first switch disposed between the holdup capacitor and the redundant power supply operable to create a conductive path between the holdup capacitor and the redundant power supply; and
    a controller having logical instructions comprising a SR flip-flop configured to close the first switch based on the voltage output falling below the voltage threshold.

* * * * *